United States Patent [19]
Kobayashi et al.

[11] Patent Number: 5,999,749
[45] Date of Patent: Dec. 7, 1999

[54] LIGHT PROJECTOR FOR CAMERA AND METHOD OF ADJUSTING THE SAME

[75] Inventors: Motoaki Kobayashi, Mitaka; Toshifumi Nakano, Sagamihara; Shin Kuroda, Kawasaki, all of Japan

[73] Assignee: Olympus Optical Co., Ltd., Tokyo, Japan

[21] Appl. No.: 09/188,004

[22] Filed: Nov. 6, 1998

[30] Foreign Application Priority Data

Dec. 10, 1997 [JP] Japan ...................................... 9-340184

[51] Int. Cl.⁶ ...................................................... G03B 15/03
[52] U.S. Cl. ........................ 396/106; 396/157; 396/158; 396/175; 362/3; 362/425; 356/123
[58] Field of Search .................................. 396/106, 157, 396/158, 175, 62; 356/121, 122, 123; 362/3, 425

[56] References Cited

U.S. PATENT DOCUMENTS 5,057,985 10/1991 Kreutzer, Jr. et al. .................. 362/425
5,099,112 3/1992 Kamitani et al. .................... 396/106 X
5,379,204 1/1995 Paterson ............................. 362/425 X

FOREIGN PATENT DOCUMENTS 63-193008 8/1988 Japan.

Primary Examiner—W. B. Perkey
Attorney, Agent, or Firm—Louis Weinstein

[57] ABSTRACT

A light projector for camera including a light emission lamp having a filament, a lamp mounting frame which holds the light emission lamp integrally therewith as well as has a pair of support shafts projecting from opposite the sides thereof with one of the support shaft having a rectangular hole defined thereto, a reflection umbrella for reflecting the light from the filament, a light projection lens disposed so that the optical axis thereof matches the optical axis of the reflection umbrella and a casing on which the reflection umbrella and the light projection lens are mounted, wherein the lamp mounting frame is held by swingably engaging the pair of support shafts and the like with a pair of sliding grooves and the like along an optical axis direction. The relative position of the filament to the reflection umbrella can be displaced in the optical axis direction, an up/down direction and a right/left direction merely by inserting a single jig into the rectangular hole and applying displacing force thereto, whereby the dispersion and the like of the position of the filament can be corrected by a simple adjustment job so that an effective ratio of light can be increased.

19 Claims, 1 Drawing Sheet

LIGHT PROJECTOR FOR CAMERA AND METHOD OF ADJUSTING THE SAME

BACKGROUND OF THE INVENTION

1. Field of the Invention

The present invention relates to a light projector for a camera and a method of adjusting the light projector, and more specifically, to a light projector for a camera for effectively projecting the light emitted from a light source and a method of adjusting the light projector.

2. Description of the Related Art

Light projectors for cameras, for example, light projectors used for the projection of, for example, auxiliary illumination light for automatic focusing (AF) and the like are composed of a light emission lamp having a light emission source, a casing for holding the light emission lamp and a reflection umbrella for reflecting the light emitted from the light emission source of the light emission lamp.

Since the above AF auxiliary illumination light is required to have directivity particularly in an illuminating direction, the position of a peak of illuminated light must be located at a prescribed position in the distribution thereof to obtain a desired intensity of illumination of the auxiliary light in a limited amount of emitted light.

When a filament is used as the light emission source of the light emission lamp, the distribution of illuminated light may be changed due to the dispersion of a position where the filament is formed and the peak of the illuminated light cannot be obtained at a desired position because it is difficult to form the filament at a specific position. In this case, since a light projector which cannot obtain a necessary intensity of illumination is rejected as a defective item in a production managing process, production efficiency is lowered.

To overcome the above drawback, there have been proposed various technologies as disclosed in, for example, Japanese Examined Patent Publication No. 6-97298.

The publication discloses a technical means for adjusting a light emitter mounted on a direction adjustment plate in three independent directions, respectively by means of front/rear adjustment screws, upper/lower adjustment screws and right/left adjustment pins.

However, since it is necessary in the light projector disclosed in Japanese Examined Patent Publication No. 6-97298 to turn the screws and pins from three different directions in the adjustment of the light emitter, it has a problem that an adjustment job is time consuming as well as requiring that the job must be carried out while maintaining a portion of a casing in an open state so that a driver, jig and the like can be inserted therethrough. Conversely, the light emitter in which a space must be secured to permit the driver, jig and the like to be inserted therethrough from the three independent directions is not always an optimum light emitter when it is applied to a camera in which the reduction of size of which is required.

SUMMARY OF THE INVENTION

An object of the present invention is to provide a light projector for camera capable of increasing the effective ratio of the light emitted from a light emission source by a simple adjustment job.

Another object of the present invention is to provide a method of adjusting a light projector for cameras capable of increasing the effective ratio of the light emitted from a light emission source by a simple adjustment job.

To briefly describe, the present invention is a light projector for camera which includes a light emission device having a light emission source, a reflection device for reflecting the light emitted from the light emission source mainly in an optical axis direction, and a holding mechanism for holding the light emission device so that the relative position of the light emission source to the reflection device can be displaced in the optical axis direction and at least one direction on a plane approximately normal to the optical axis and displacing the light emission source in at least the two independent directions only by applying force necessary to the displacement to only one location of the light emission device.

Further, the present invention is directed to a method of adjusting a light projector for camera which includes the steps of emitting light from the light emission source of a light emission device and reflecting the light mainly in an optical axis direction by a reflection device, sensing the light at a prescribed position by a sensing device, and determining a position where a peak is sensed by the sensing device by displacing the relative position of the light emission source to the reflection device in the optical axis direction and at least one direction on a plane approximately normal to the optical axis by applying a displacing force to only one location of a holding mechanism for holding the light emission device.

These as well as other objects and advantages of the present invention will become further apparent from the following detailed description.

DESCRIPTION OF THE PREFERRED EMBODIMENT

An embodiment of the present invention will be described below with reference to the drawings.

Figure 1:
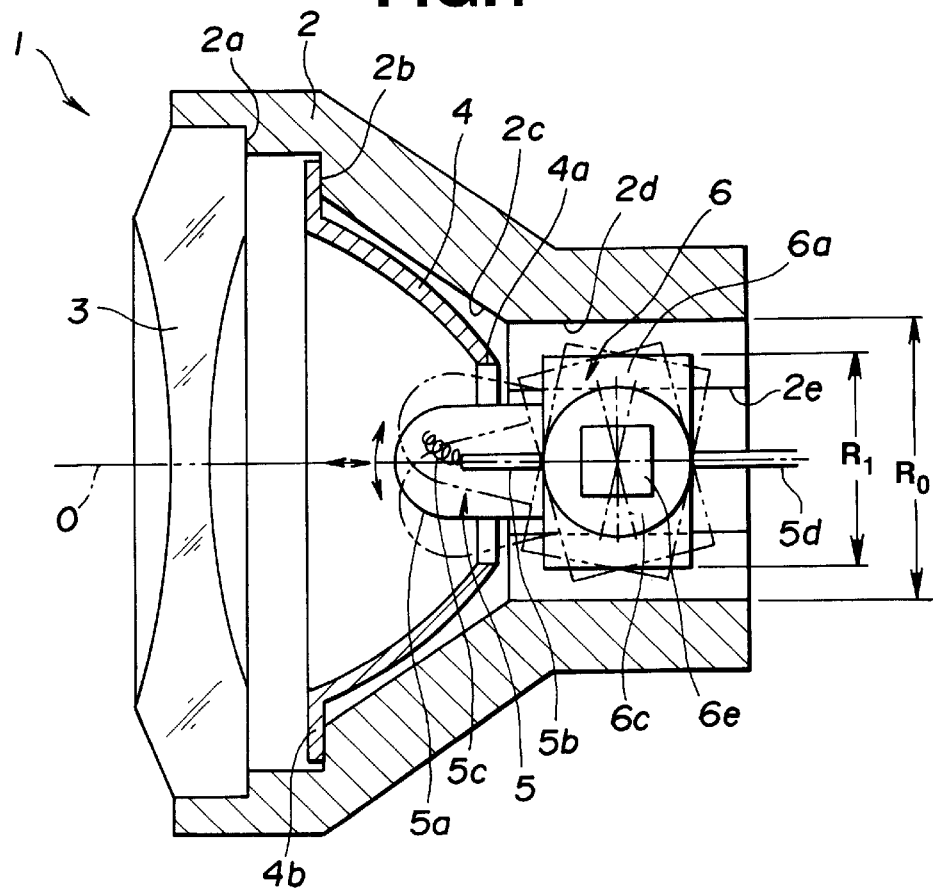
FIG. 1 is a sectional view taken along an optical axis showing an arrangement of a light projector for camera of an embodiment of the present invention.
Figure 2:
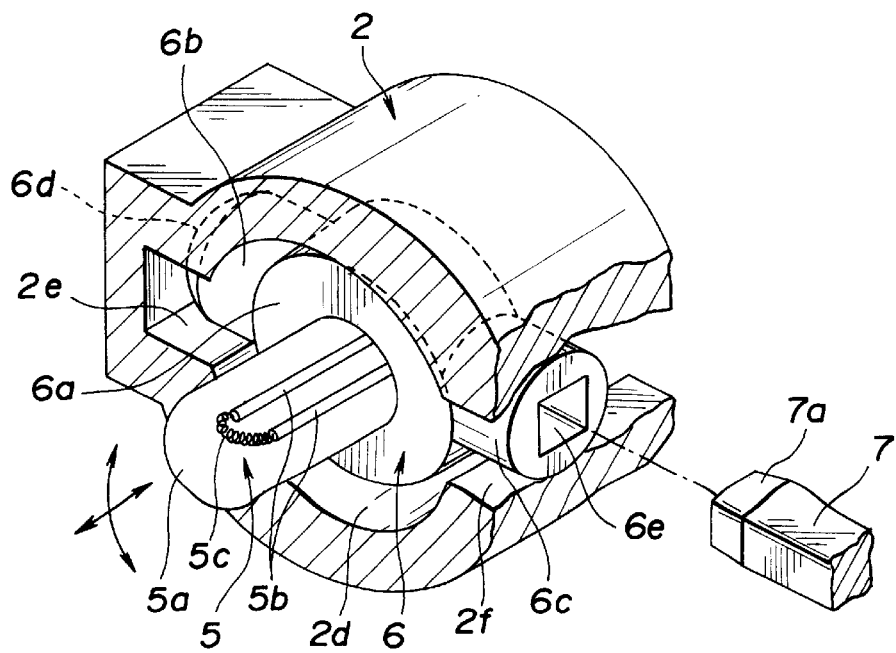
FIG. 2 is a perspective view partly in cross section showing an arrangement of a main portion of the light projector for a camera of the embodiment.

FIG. 1 is a sectional view taken along an optical axis showing an arrangement of a light projector for camera of an embodiment of the present invention and FIG. 2 is a perspective view partly in cross section showing an arrangement of a main portion of the light projector for camera of the embodiment.

The light projector 1 for camera which is used to illuminate, for example, AF auxiliary light is composed of a light projection lens 3, a reflection umbrella 4 as a reflection means, a light emission lamp 5 as a light emission means and a lamp mounting frame 6 as a holding member for holding the light emission lamp 5 integrally therewith and these elements are assembled in a casing 2 which is a substantially cylindrical main body member.

The casing 2 is a member for constituting the holding member of the light emission lamp 5 as the light emission means and has a stepped portion 2a formed around the inner peripheral surface of the casing 2 which is located at the front end thereof in the direction of an optical axis O and the light projection lens 3 is engaged with the stepped portion 2a and adhered and fixed thereto.

A next stepped portion 2b is formed around the inner peripheral surface of the casing 2 which is located slightly rearward of the stepped portion 2a and a flange portion 4b disposed around the front end portion of the reflection umbrella 4 is fixed to the stepped portion 2b. The reflection umbrella 4 is disposed so that the optical axis thereof matches the optical axis of the light projection lens 3 and is arranged as an optical axis common to the optical axis O. The reflecting curved surface of the reflection umbrella 4 is formed to a curved surface having a focal point of one of a rotated ellipse surface or a rotated parabola surface. The reflecting curved surface of the reflection umbrella 4 is disposed slightly spaced apart from the casing 2 so that it is not in direct contact with the inclined portion 2c of the casing 2.

A circular hole 4a is defined to the reflection umbrella 4 at the rear end thereof in the direction of the optical axis O and the light emitting unit of the light emission lamp 5 projects through the circular hole 4a.

The light emission lamp 5 has a pair of electrodes 5b which are disposed, for example, right and left of the axis O and a filament 5c acting as a light emission source (a substantial light emitting unit for projecting light) is attached to the extreme ends of the electrodes 5b. In such a case, that is, when the electrodes 5b are disposed at the right and left positions, the positions of the filament 5c at the extreme ends of the electrodes 5b are dispersed mainly in an up/down direction. Further, the electrodes 5b and the filament 5c are covered with a glass bulb 5a which is composed of a transparent material such as glass or the like and formed to, for example, a T-shape. The pair of electrodes 5b are connected to a pair of terminals 5d extending from the rear end of the light emission lamp 5 so that the light emission lamp 5 is connected to a not shown electric circuit and the like through the terminals 5d.

The lamp mounting frame 6 is a member for constituting the holding mechanism of the light emission means together with the casing 2 and holds the light emission lamp 5 by integrally engaging it in the inside of the bottom base portion 6a of the lamp mounting frame 6 formed to a substantially cylindrical shape. The lamp mounting frame 6 has a pair of column-shaped support shafts 6b, 6c which project coaxially from the right and left peripheral surfaces of the bottom base portion 6a. One of the support shafts i.e., the support shaft 6b has an extreme end 6d molded to a spherical shape and the other support shaft 6c has an end surface in which a rectangular hole 6e is formed. The rectangular hole 6e is an inserting hole with which the extreme end 7a of a jig 7 having, for example, a quandrangular-prism-shape is engaged. The pair of terminals 5d of the light emission lamp 5 extend further rearward of the rear end surface of the bottom base portion 6a.

The portion of the casing 2 rearward of the inclined portion 2c is formed to a small diameter cylindrical portion 2d and the bottom base portion 6a of the lamp mounting frame 6 is disposed therein with prescribed spaced intervals defined therebetween. That is, the inside diameter R0 of the small diameter cylindrical portion 2d and the outside diameter R1 of the bottom base portion 6a are set to satisfy R0>R1 as well as a space sufficient to permit the lamp mounting frame 6, which holds the light emission lamp 5, to swing therein is secured in the small diameter cylindrical portion 2d as described below.

Further, sliding grooves 2e, 2f into which the support shafts 6b, 6c can be slidably inserted are formed to both the right and left sides of the small diameter cylindrical portion 2d in parallel with the optical axis O. The light emission lamp 5 and the lamp mounting frame 6 are is held in the casing 2 only by the engagement of the support shafts 6b, 6c with the sliding grooves 2e, 2f and the other portions are not in contact with the casing 2.

Next, how the position of the light emission lamp 5 is adjusted in the light projector 1 arranged as described above will be described below.

The light projector 1 assembled as described above is mounted on a not shown adjustment device and a sensor as a sensing means for measuring the intensity of illumination of the light emitted from the light projector 1 is disposed at a prescribed position.

The light emission lamp 5 is lit in this state and the extreme end 7a of the jig 7 is inserted into the rectangular hole 6e of the lamp mounting frame 6.

When the jig 7 is slid in the direction of the optical axis O in parallel therewith by applying displacing force thereto, the lamp mounting frame 6 is moved along the sliding grooves 2e, 2f in the direction of the optical axis O in parallel therewith to thereby move the light emission lamp 5 in the direction of the optical axis O and the sensor searches the position where the peak of the emitted light is located is sensed.

When the position of the peak is sensed, the lamp mounting frame 6 and accordingly the light emission lamp 5 are swung about the support shafts 6b, 6c by applying displacing force to the jig 7 in the turning direction thereof. With this operation, the position where the sensor senses the peak is searched by moving the filament 5c as the light emission source upward and downward on a plane normal to the optical axis O.

As described above, when the light projector 1 is observed from the front side thereof in the direction of the optical axis O, the position of the filament 5c is mainly dispersed in the up/down direction because the electrodes 5b are disposed at the right and left positions with respect to the bottom base portion 6a. Therefore, the position adjustment may be finished at this stage. However, when the position is to be more finely adjusted or the electrodes 5b are disposed at up/down positions with respect to the bottom base portion 6a and the position of the filament 5c is dispersed in a right/left direction, the position is further adjusted in the right/left direction.

More specifically, when displacing force is applied to the jig 7 so as to turn it in the right/left direction about the point where the center line of the jig 7 intersects the optical axis O, the position of the filament 5c is moved in the right/left direction on the plane normal to the optical axis O. Then, the position where the sensor senses the peak is searched and the filament 5c is located at the position.

As described above, an optimum peak position can be searched by adjusting the position of the light emission lamp 5 with respect to the reflection umbrella 4 in the direction of the optical axis O and at least one direction on the plane normal to the optical axis O.

When the position of the light emission lamp 5 is optimized in the light projector 1, an adhesive is applied between the lamp mounting frame 6 and the casing 2 and solidified to thereby fix them at the position.

Although the position of the filament 5c is sequentially adjusted in the optical axis direction, the up/down direction and the right/left direction in the above description, the optimum peak position is sensed in an actual manufacturing process by adjusting the position simultaneously in these three directions.

Although the light emission lamp using the filament is exemplified in the above description, the present invention is not limited thereto and a light emission lamp using, for example, an LED and the like as the light source may be used.

Further, although the aforesaid light projector is described as the light projector for AF auxiliary illumination light, the present invention is not limited thereto and is also applicable to, for example, a light projector for reducing a red-eye phenomenon, a modeling lamp for emitting auxiliary light used to the visual field of a finder.

According to the embodiment arranged as described above, the position of a filament displaced from a center in a light emission lamp can be adjusted to an optimum position where the effective ratio of light of the light emission lamp can be increased by adjusting the position of the light emission lamp not only in the optical axis direction but also in the up/down direction and the right/left direction on the plane normal to the optical axis. Thus, a light emission lamp which was conventionally rejected due to an insufficient amount of the light emitted therefrom can be made usable, whereby the yields of light emission lamps can be enhanced. Since the position of the filament can be adjusted in the three independent directions by means of only the single jig, a time necessary to an adjustment job can be shortened. In addition, what is required in the embodiment is only the small space through which the jig can be inserted, the light emission lamp of the present invention can be effectively applied to a camera whose size is reduced.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A light projector for a camera, comprising:
   light emission means having a light emission source;
   reflection means for reflecting light emitted from said light emission source mainly in an optical axis direction; and
   a holding mechanism for holding said light emission means so that the relative position of said light emission source to said reflection means can be displaced in the optical axis direction and at least one direction on a plane approximately normal to the optical axis and enabling displacement of said light emission source in at least said two independent directions merely by applying a force necessary to the displacement at only one location on said light emission means.

2. A light projector for a camera according to claim 1, wherein said holding mechanism comprises:
   a holding member for holding said light emission means integrally therewith, said holding member having a support shaft portion projecting therefrom; and
   a main body member having sliding grooves along the optical axis with which said support shaft portion is engaged to permit sliding and swinging movement of said holding member relative to said main body member.

3. A light projector for a camera according to claim 1, wherein said light emission means is a light emission lamp having a filament as the light emission source.

4. A light projector for a camera according to claim 2, wherein said light emission means is a light emission lamp having a filament as the light emission source.

5. A light projector for a camera according to claim 1, wherein said holding mechanism holds said light emission means so that the light emission source can be displaced in a total of three directions including the optical axis direction and two independent directions lying in a plane approximately normal to the optical axis displacement of the light emission source in these three independent directions being accomplished merely by applying force necessary to the displacement to only one location on said light emission means.

6. A light projector for a camera according to claim 5, wherein said holding mechanism comprises:
   a holding member for holding said light emission means integrally therewith, the holding member having a support shaft portion projecting therefrom; and
   a main body member having sliding grooves along the optical axis with which said support shaft portion is engaged to permit sliding and swinging of said holding member relative to said main body member.

7. A light projector for a camera according to claim 6, wherein said light emission means is a light emission lamp having a filament as the light emission source.

8. A light projector for a camera according to claim 1, wherein said light emission means includes an LED.

9. A light projector for a camera according to claim 2, wherein said light emission means includes an LED.

10. A light projector for a camera according to claim 2, wherein said support shaft portion projects in a direction approximately normal to the optical axis.

11. A light projector for a camera according to claim 2, wherein said support shaft portion is composed of a pair of support shafts projecting to opposite sides of said holding member and in a direction approximately normal to the optical axis and one of said support shafts has an insertion hole defined thereto so that it is applied with force necessary to adjust the holding member through an adjustment jig inserted into said insertion hole.

12. A light projector for a camera according to claim 2, wherein said main body member fixes and holds said reflection means.

13. A light projector for a camera according to claim 2, wherein a portion of the main body member encloses the holding member and is designed to provide a space sufficient to enable said holding member to swing sufficient to enable adjustment thereof.

14. A light projector for a camera, comprising:
   a light emission lamp having a filament as a light emission source;
   an umbrella-shaped reflector for reflecting the light emitted from the light emission source mainly in an optical axis direction; and
   a casing for supporting the light emission source and fixing and holding said reflector so that the relative position of the light emission source to said reflector can be displaced in the optical axis direction and at least one direction on a plane approximately normal to the optical axis thereby displacing the light emission source in at least the two independent directions merely by applying force necessary to the displacement to only one location on said light emission lamp by means of a single jig employed to adjust the light emission lamp.

15. A light projector for a camera, comprising:
   a light emission lamp having a filament as a light emission source;
   a lamp mounting frame for holding said light emission lamp integrally therewith, said lamp mounting frame having a pair of support shafts projecting from opposite sides thereof with one of said support shafts having an inserting hole defined thereto so that an adjustment jig is engaged in the inserting hole;
   a reflector for reflecting the light emitted from the light emission source mainly in an optical axis direction;

a light projection lens disposed so that the optical axis thereof matches the optical axis of said reflector; and a casing for holding said lamp mounting frame by swingably engaging the pair of support shafts of said lamp mounting frame with a pair of sliding grooves extending in an optical axis direction as well as holding said reflector and said projection lamp integrally therewith, whereby the relative position of the filament to said reflector can be displaced in the optical axis direction and at least one direction on a plane approximately normal to the optical axis merely by inserting a single jig into the inserting hole of said support shaft of said lamp mounting frame and applying displacing force thereto.

16. A light projector for a camera, comprising:

light emission means having a light emitting unit for emitting light;

a holding member for holding said light emission means integrally therewith; and an adjustment mechanism for adjusting a position of the light emitting unit of said light emitting means in at least one of an up/down direction and a right/left direction in the light projector and further in the light projecting direction of the light emitting unit in the light projector only by actuating said holding member.

17. A light projector for a camera according to claim 16, wherein said light emission means is a light emission lamp having a filament as a light emission source.

18. A method of adjusting a light projector for a camera, comprising the steps of:

emitting light from a light emission source of light emission means and reflecting the light mainly in an optical axis direction by reflection means;

sensing the light at a prescribed position by sensing means; and determining a position where a peak is sensed by said sensing means by displacing the relative position of the light emission source to said reflection means in the optical axis direction and at least one direction on a plane approximately normal to the optical axis by applying displacing force to only one location on a holding mechanism for holding said light emission means.

19. A method of adjusting a light projector for camera according to claim 18, further comprising the step of fixing said light emission means at the position where the peak is sensed.

* * * * *

UNITED STATES PATENT AND TRADEMARK OFFICE
CERTIFICATE OF CORRECTION

PATENT NO : 5,999,749
DATED : December 7, 1999
INVENTOR(S) : Motoaki Kobayashi; Toshifumi Nakano and Shin Kuroda It is certified that error appears in the above-identified patent and that said Letters Patent are hereby corrected as shown below:

At column 2, line 48, delete "camera" and insert -- cameras --.
At column 3, line 64, delete "is".
At column 4, line 1, delete "how".
At column 4, line 1, delete "position" and insert -- positioning --.

Signed and Sealed this

Fifteenth Day of May, 2001

Attest:

NICHOLAS P. GODICI

*Attesting Officer*   *Acting Director of the United States Patent and Trademark Office*